(No Model.)

2 Sheets—Sheet 1.

C. HARRINGTON.
BALING PRESS.

No. 504,933.  Patented Aug. 29, 1893.

Witnesses
A. B. Mattingly
W. S. Duvall

Inventor
Chas. Harrington
By his Attorneys,
C. A. Snow & Co.

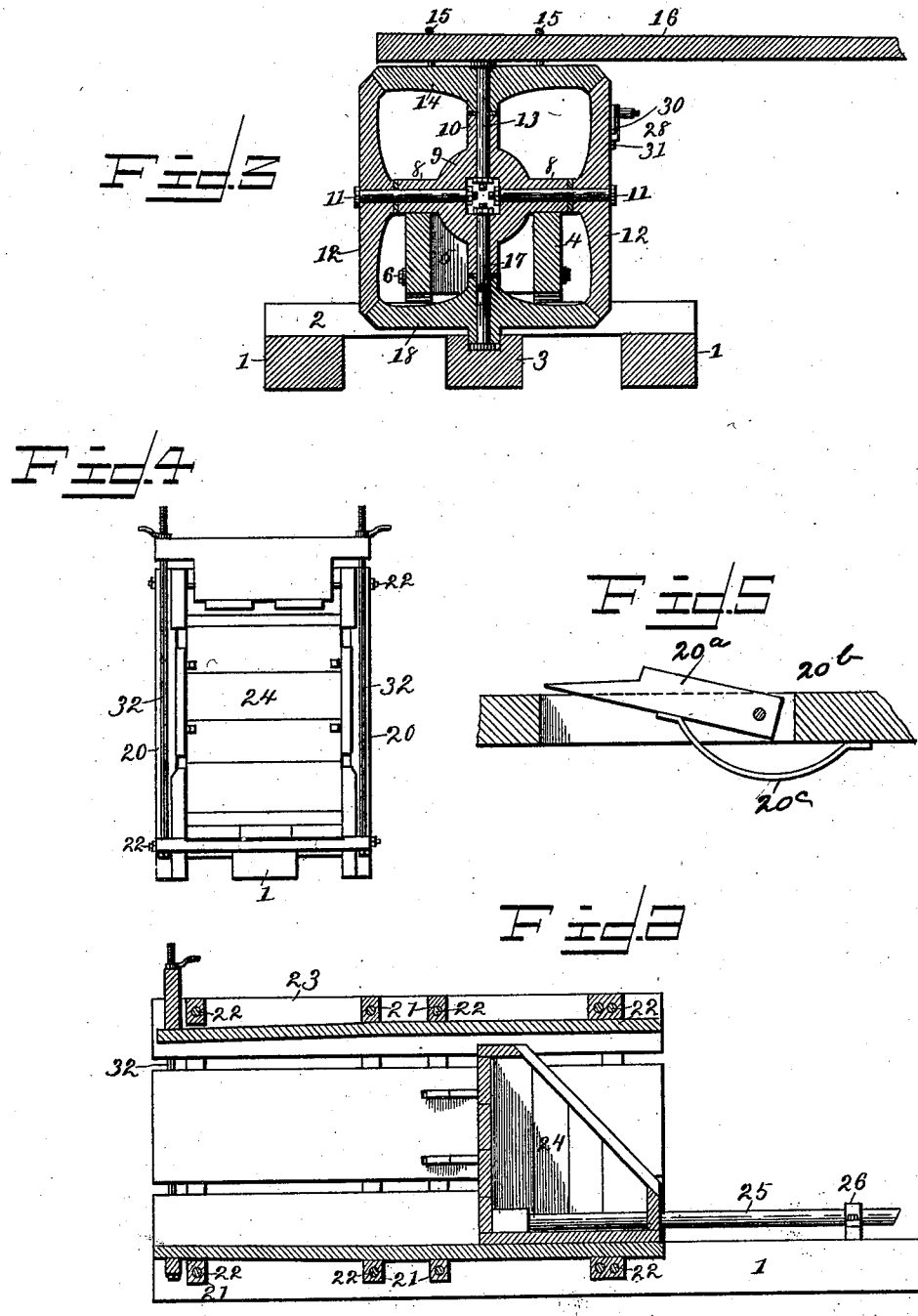

UNITED STATES PATENT OFFICE.

CHARLES HARRINGTON, OF BARTLETT, TEXAS, ASSIGNOR OF ONE-HALF TO EDWARD ROWNTREE, OF SAME PLACE.

BALING-PRESS.

SPECIFICATION forming part of Letters Patent No. 504,033, dated August 29, 1893.

Application filed February 14, 1893. Serial No. 462,286. (No model.)

*To all whom it may concern:*

Be it known that I, CHARLES HARRINGTON, a citizen of the United States, residing at Bartlett, in the county of Williamson and State of Texas, have invented a new and useful Baling-Press, of which the following is a specification.

My invention relates to improvements in baling presses of that class adapted to bale hay; and the objects in view are to provide a press and suitable power for operating the same, and to so construct said press as to double the capacity of the ordinary press, that is to form two bales at one time, the press being operated by the same power; and, furthermore, to provide means for conveniently transporting the same when desired.

Other objects and advantages of the invention will appear in the following description and the novel features thereof will be particularly pointed out in the claims.

Figure 1:
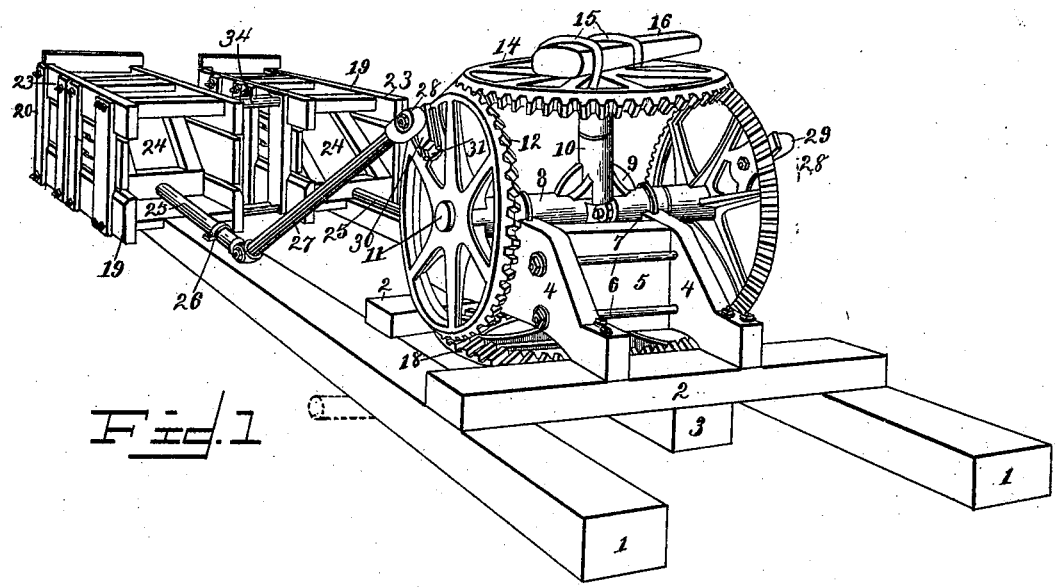
Figure 2:
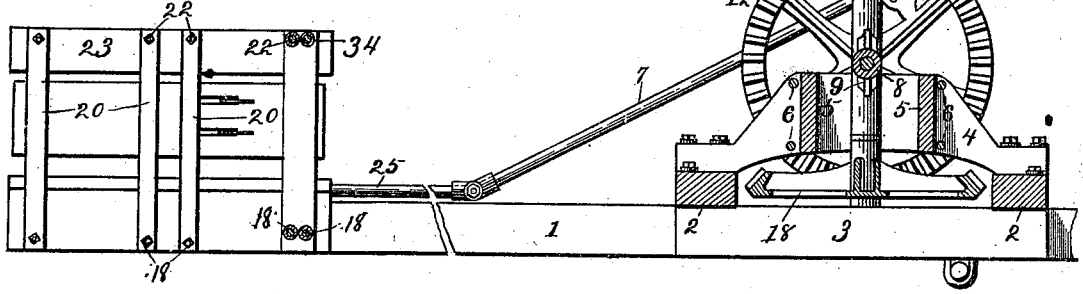

Referring to the drawings:—Figure 1 is a perspective view of a press constructed in accordance with my invention. Fig. 2 is a vertical longitudinal sectional view between the baling chambers and through the power mechanism. Fig. 3 is a detail in transverse section of the power. Fig. 4 is a rear view of one of the baling chambers. Fig. 5 is a detail of one of the dogs. Fig. 6 is a longitudinal sectional view of one of the baling chambers.

Like numerals of reference indicate like parts in all the figures of the drawings.

1 designates a pair of longitudinal sills, upon which near one end, is mounted a pair of short transverse cross-sills 2, the same being connected at their centers by a short longitudinal sill 3. The sills 1, 2 and 3 are all securely bolted together and the whole supports a pair of opposite bearing-standards 4, which surmount and are bolted to the cross-sills 2, being interposed between the opposite end-pieces 5, thus forming a rectangular power-frame, which is secured together by means of tie-bolts 6, passing through the sides 4 and serving to bind the same against the opposite ends of the end-pieces 5. The opposite sides 4 have their upper edges provided with semicircular recesses 7, and seated in the same are the transversely opposite horizontal branches 8, of a casting 9. The casting 9 is a "four-way" casting, and in addition to the branches 8, is provided with the vertically opposite branches 10, the whole being formed in one piece.

In each of the branches 8 and 10 there is formed a bearing or longitudinal bore, and the branches 8 are occupied by a pair of short horizontal shafts 11, which extend beyond the outer ends of the casting and have mounted thereon beveled gear-wheels 12. In the upper branch 10 of said casting there is located a shaft 13, and the same has mounted thereon a beveled gear-wheel 14, which engages at opposite sides the upper sides of the beveled-gears 12. The upper side of the gear-wheel 14 is provided with a pair of keepers 15, and in the same is located the butt-end of a sweep-arm 16. The lower branch 10 of the casting 9 is provided with a shaft 17, which rests on the longitudinal sill 3, and said shaft carries a beveled-gear 18, which engages with the teeth at the under side of the gears 12 at the opposite sides of the machine and serves to steady the movements of the gears and lend strength thereto.

19 designates a pair of baling-chambers, each consisting of a series of side-posts 20, lower cross-bars 21 and tie-rods 22. These chambers are of the ordinary construction and in addition to the posts, cross-bars, and tie-rods mentioned, each further comprises the four usual longitudinal beams 23.

In each of the chambers, which, as will be seen, are located parallel to each other, there are mounted for movement plungers 24, and the same have their stems 25 mounted for movement in loose keepers 26, with which the sills 1 are provided upon their upper sides. Pitman-rods 27, are pivoted as at 28, to the outer ends of the stems 25, and also to the wrist-pins 29, which are located upon the gear-wheels 12. The wrist-pins 29, extend from adjacent plates 30 which, as shown, are mounted adjustably in pairs of ways 31, formed upon the outer faces of the beveled-gears 12 and provided with perforations through which pins may be passed that also extend through similar perforations in the securing plate. By an adjustment of the wrist-pin, it will be obvious that the length of stroke of the plungers may be determined.

The side-walls of each chamber are provided with dogs 20ª of any desired description, as is usual, said dogs being pivoted as at 20ᵇ and borne against by bowed springs 20ᶜ, or any other form of detent may be employed for the purpose of preventing retraction of the hay with that of the plungers. The bottoms of the chambers are, as will be obvious, somewhat resilient as are also the tops thereof, and through these bottoms and tops at the rear ends of the chambers I pass pairs of tie-rods 32, the same being provided at their upper ends with binding nuts, whereby by running the ends down upon the rods the exits of the presses are made smaller and hence obstruct to a greater degree the passage therethrough of the bales as they are formed.

Between the front pair of posts of the two adjacent chambers upper and lower pairs of tubular-braces 34, are located, and through these extend the tie-bolts 22, that are located at the front of the chambers, the said tubular braces thus serving in connection with the tie-bolts as braces and also as spacing-devices between the chambers. It will be seen that the points of connection between the connecting-rods 27 and the gear-wheels 12 are not directly opposite each other, so that when one plunger has reached the length of its stroke the other has not quite reached this point, so that the entire pressure of the power is exerted through one plunger at a time.

In operation the draft animal is hitched to the sweep-arm 16, and hay is fed into the chambers in the usual manner, the plungers being operated, that is reciprocated, forcing the hay toward the back ends of the chambers and serving to compress the same against the preceding bale, said bales being spaced apart by the usual division boards, not shown. As soon as a bale has been formed and tied a second board is inserted and the operation repeated, the board being inserted between each bale in the usual manner, and thus serving as an abutment against which the material being baled may be pressed.

From the foregoing description in connection with the accompanying drawings it will be seen that I have provided a cheap and simple baling-mechanism, whose capacity is double that of the ordinary press, the whole being operated by a single power of cheap and simple construction. The sills 1 extend rearwardly under the bottoms of the chambers and are connected to the lower sills thereof by means of transverse bolts 36 passed through the two sets of sills.

To the under sides of the sills 1 at points opposite the power and at the rear ends thereof axles 37 are located and adapted for the accommodation of ordinary ground-wheels, not shown, whereby, as will be obvious, the press may be transported to any point for use, Having described my invention, what I claim is—

1. In a baling-press, the combination with a suitable base, a pair of baling-chambers arranged at one end thereof, and a framework at the opposite end of the base, of a pair of plungers mounted in the baling-chambers, opposite horizontal shafts located on the framework, beveled gears at the outer ends of said shafts, connecting-rods between the beveled gears and the ends of the plunger-stems, and a superimposed beveled gear supported in the framework and meshing with the beveled gears, and a sweep-arm carried by said superimposed gear, substantially as specified.

2. In a baling-press, the combination with a pair of baling-chambers, their plungers and stems, of a framework located opposite the chambers, a "four-way" casting supported in the framework, pairs of horizontal and vertical shafts located in the branches of the casting, beveled gears located upon the outer ends of each of the shafts and engaging each other, a sweep-arm carried by the upper horizontal gear, and pitman-rods connected with the side-gears and loosely connected to the stems of the plungers, substantially as specified.

3. In a baling-press, the combination with the opposite sills 1, cross-sills 2, standards 4, end-pieces 5, and the tie-bolts 6, of the "four-way" casting 9, having the transverse branches 8 and vertically opposite branches 10, the shafts 11 located in the branches 8, the beveled gear-wheels 12 carried by said shafts, a shaft 13 located in the upper branch 10, the gear-wheel 14 carried by the shaft and provided with keepers 15, the sweep-arm 16 mounted therein, the lower shaft 17, the beveled gear 18, the ways 31 mounted on the side gears 12 and provided with perforations, and the wrist-pins 29 having plates 30 together with their locking-pins, the baling-chambers, the plungers mounted therein, the stems for the plungers, keepers for the stems mounted on the sills 1, and the connecting-rods 27 between the ends of the stems and wrist-pins, substantially as specified.

4. In a baling-press, the combination with the two baling-chambers comprising inner posts, the upper and lower pairs of tubular braces, and the tie-rods passing entirely through the chambers and through the braces, of the plungers mounted in the chambers, and means for operating said plungers, substantially as specified.

In testimony that I claim the foregoing as my own I have hereto affixed my signature in the presence of two witnesses.

CHAS. HARRINGTON.

Witnesses:
JOHN R. FUTRELL,
D. W. JOINER.